March 19, 1946.    F. D. McCULLY    2,396,799
ELECTRIC SOLDERING IRON
Filed Feb. 28, 1944
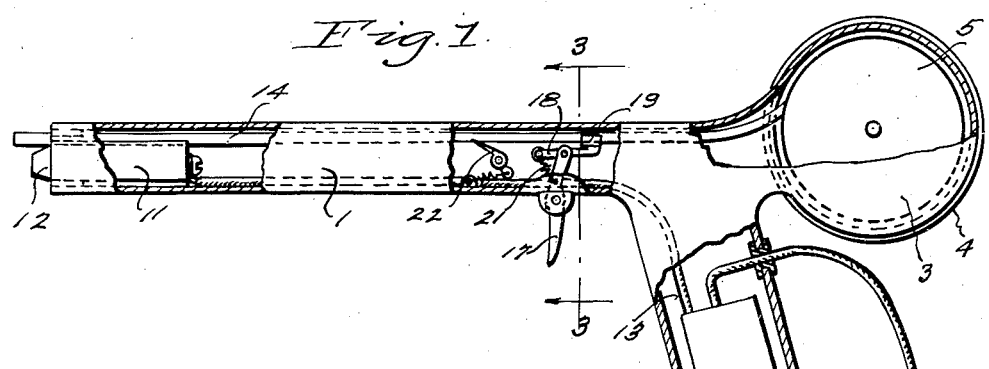
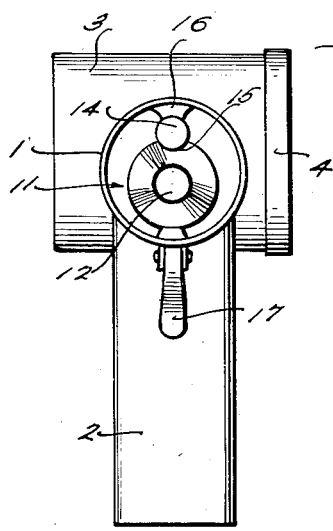
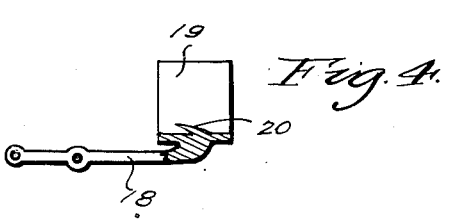
Inventor
Frank D. McCully
By Clarence A. O'Brien
and Harvey B. Jacobson
Attorneys Patented Mar. 19, 1946

2,396,799

UNITED STATES PATENT OFFICE 2,396,799

ELECTRIC SOLDERING IRON

Frank D. McCully, Joseph, Oreg.

Application February 28, 1944, Serial No. 524,265

2 Claims. (Cl. 219—27)

The present invention relates to new and useful improvements in electric soldering irons of the gun type, and has for its primary object to provide, in a manner as hereinafter set forth, a device of this character comprising a novel construction and arrangement whereby the solder will be heated to the melting point substantially instantaneously.

Other objects of the invention are to provide an electric soldering iron of the aforementioned character which will be comparatively simple in construction, strong, durable, highly efficient and reliable in use, compact, light in weight, and which may be manufactured at low cost.

All of the foregoing, and still further objects and advantages of the invention, will become apparent from a study of the following specification, taken in connection with the accompanying drawing wherein like characters of reference designate corresponding parts throughout the several views, and wherein:

Figure 1 is a view in side elevation of an electric soldering iron constructed in accordance with the present invention with portions broken away in section.

Figure 2 is a view in front elevation of the device.

Figure 3 is a view in transverse section, taken substantially on the line 3—3 of Figure 1.

Figure 4 is a detail view in side elevation of the solder feeder with a portion broken away in section.

Referring now to the drawing in detail, it will be seen that the embodiment of the invention which has been illustrated comprises a tube or barrel 1 of suitable length, diameter and material. Depending from the rear end portion of the barrel 1 and communicating therewith is a hollow pistol-grip handle 2. Mounted transversely on the rear end of the barrel 1 and communicating therewith is a cylindrical magazine 3 having a removable cap 4 on one end. A reel 5 is rotatably mounted in the magazine 3.

The hollow handle 2 accommodates a transformer 6. A conductor cord 7 is provided for connecting the transformer 6 to an electric receptacle through the medium of a conventional plug 8 on said cord. Also connected to the transformer 6 is a ground wire 9. A clip 10 is provided for connecting the ground wire 9 to the work.

Mounted longitudinally in the forward end portion of the barrel 1 is an element 11 of substantially circular cross section, said element being of chrome steel or other suitable metal. The element 11 includes a tapered forward end portion or nose 12 which projects beyond the barrel 1. A wire 13 electrically connects the transformer 6 to the element 11.

A length of solder 14 is wound on the reel 5 in the magazine 3. The solder 14 is threaded or inserted through the barrel 1 and passes longitudinally over the element 11 to project from the forward end of said barrel. A longitudinal groove 15 in the upper portion of the element 11 slidably accommodates the solder 14. A guide 16 in the upper portion of the barrel 1, at its forward end, retains the solder 14 in the groove 15.

Pivotally mounted in the lower portion of the barrel 1 adjacent the handle 2 is a finger lever or trigger 17. Pivotally mounted on the upper end portion of the trigger 17 for operation in the barrel 1 is a pawl 18 for feeding the solder 14. Toward this end, the pawl 18 comprises, on one end, an upstanding segmental guide 19 through which the solder 14 passes. A tooth 20 in the guide 19 is adapted to bite into the solder 14 for feeding said solder forwardly in the barrel 1. A spring 21 is connected to the other end of the pawl 18 for maintaining same in engagement with the solder 14 and for returning the trigger 17. A spring-loaded dog 22 in the barrel 1 forwardly of the trigger 17 is adapted to bite into the solder 14 for securing said solder against reverse movement.

It is thought that the operation of the device will be readily apparent from a consideration of the foregoing. Briefly, the plug 8 is inserted in a suitable electric receptacle and the clip 10 is applied to the work. The projecting forward end of the solder 14 is then contacted with the work for completing the circuit. When this occurs, the electric current flows through the transformer 6, the conductor wire 13, the element 11 and the solder 14 to the work and substantially immediately heats said solder 14 to the melting point. The nose 12 of the element 11 may, if desired, be used for spreading or flattening the solder. By actuating the trigger 17 with the finger of the hand which grips the handle 2, the solder 14 may be fed forwardly through the barrel 1 as it is needed.

It is believed that the many advantages of an electric soldering iron constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. An electric soldering iron comprising a cylindrical one piece barrel, a hollow handle depending from one end portion of the barrel and communicating therewith, a magazine on said one end of the barrel and communicating therewith, a reel rotatably mounted in the magazine, a length of solder wound on the reel with an end portion extending longitudinally through the barrel, a metallic element of substantially circular cross section mounted longitudinally in the forward end portion of the barrel and terminating with a pointed nose projecting forward through the barrel, a longitudinal groove in the upper portion of said element slidably accommodating the solder from said reel, a transformer mounted in the handle and electrically connected to the element for heating the same, means for connecting the transformer to a source of current, a ground wire connected to the transformer, and means for manually feeding the solder longitudinally through the barrel, said feeding means consisting of a trigger pivoted in front of said handle, a pawl mounted to rock on the trigger and provided with a segmental saddle in which the solder rides in passing through the barrel, a tooth in said saddle and means causing said tooth to grip the solder; whereby upon said trigger being pressed said pawl will cause forward motion of said solder in direction of said nose.

2. An electric soldering iron comprising a cylindrical one piece barrel, a hollow handle depending from one end portion of the barrel and communicating therewith, a magazine on said one end of the barrel and communicating therewith, a reel rotatably mounted in the magazine, a length of solder wound on the reel with an end portion extending longitudinally through the barrel, a metallic element of substantially circular cross section mounted longitudinally in the forward end portion of the barrel and terminating with a pointed nose projecting forward through the barrel, a longitudinal groove in the upper portion of said element slidably accommodating the solder from said reel, a transformer mounted in the handle and electrically connected to the element for heating the same, means for connecting the transformer to a source of current, a ground wire connected to the transformer, and means for manually feeding the solder longitudinally through the barrel, and friction means for preventing reverse motion of the solder, said feeding means consisting of a trigger pivoted in front of said handle a pawl mounted to rock on the trigger and provided with a segmented saddle in which the solder rides in passing through the barrel, a tooth in said saddle and means causing said tooth to grip the solder, whereby upon said trigger being pressed said pawl will cause forward motion of said solder in direction of said nose.

FRANK D. McCULLY.